Figures 1, 2:
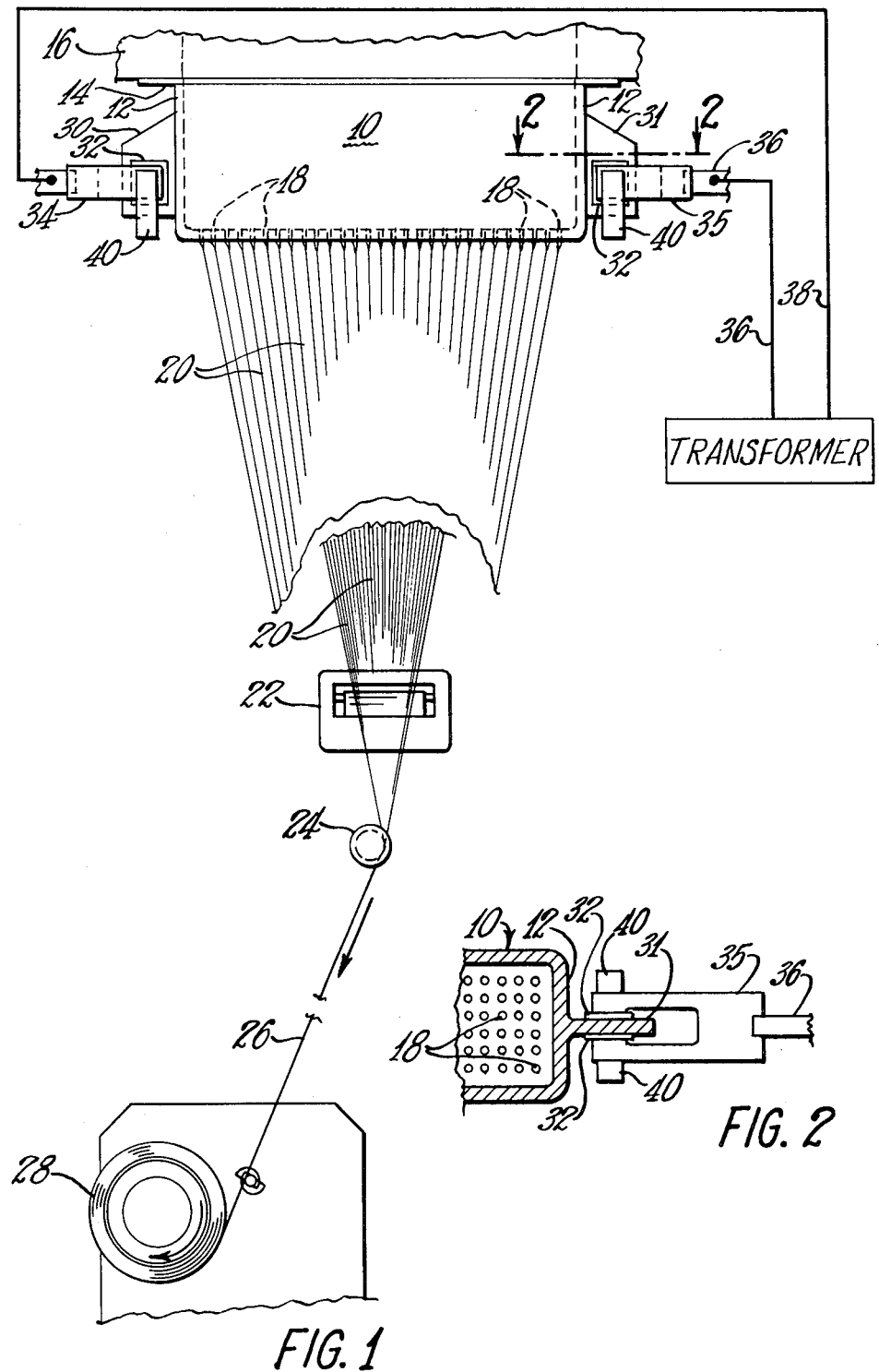

United States Patent [19]

Hinze

[11] 4,185,980
[45] Jan. 29, 1980

[54] MANUFACTURING GLASS WITH IMPROVED SILICON CARBIDE BUSHING OPERATION

[75] Inventor: Jay W. Hinze, Newark, Ohio

[73] Assignee: Owens-Corning Fiberglas Corporation, Toledo, Ohio

[21] Appl. No.: 942,734

[22] Filed: Sep. 15, 1978

[51] Int. Cl.² .............................................. C03B 37/02
[52] U.S. Cl. ................................................ 65/1; 13/6;
 13/25; 65/374 R; 174/126 R
[58] Field of Search ................... 13/6, 25; 174/126 R;
 65/1, 374 R, DIG. 4

[56] References Cited

U.S. PATENT DOCUMENTS

| | | | |
|---|---|---|---|
| 2,907,972 | 10/1959 | Schildhauer et al. | 13/25 X |
| 3,350,182 | 10/1967 | Hunter et al. | 65/1 |
| 3,400,253 | 9/1968 | Marker | 65/DIG. 4 |

FOREIGN PATENT DOCUMENTS 943054 11/1963 United Kingdom ..................... 13/25

Primary Examiner—Robert L. Lindsay, Jr.
Attorney, Agent, or Firm—Ronald C. Hudgens; Charles F. Schroeder; Robert F. Rywalski

[57] ABSTRACT

An improvement is provided in apparatus of the type which comprises a glass feeder adapted to discharge a stream of glass, the feeder including a terminal or tab on each of opposed side wall portions and means are provided, including electrical connectors respectively connected to one or the other of the terminals for passing an electrical current through the bushing so as to resistively heat it and maintain it at an elevated temperature; the improvement resides in employing a bushing essentially comprising silicon carbide and locating a graphitic material intermediate the respective terminal and connector and in this way inhibiting the formation of silica to thereby provide a bushing with a longer operating life.

10 Claims, 2 Drawing Figures

MANUFACTURING GLASS WITH IMPROVED SILICON CARBIDE BUSHING OPERATION

THE INVENTION

The present invention relates to the art of glass manufacturing, and more particularly it relates to the manufacture of fibrous glass products by the use of a resistively heated bushing.

Fibrous glass products have been manufactured for many years using precious metal bushings which have been resistively heated. Typically these bushings take the form of having, on a wall portion thereof, opposed electrical terminals, for example in the form of tabs or ears, which are suitably attached to an electric circuit whereby current passes between the terminals and through the bushing. In this manner the bushing is resistively heated and maintained at an elevated temperature so as to retain molten glass provided to the bushing in its molten state and to feed such glass as a stream which is then attenuated into fibers. Alternatively those bushings can be used to melt glass "marbles". Such techniques have operated quite satisfactorily but it will be appreciated that they significantly add to the manufacturing costs because of the significant expense involved with regard to the precious metals of which the bushings are fabricated.

Proposals have been made in the prior art to employ silicon carbide bushings. In this regard reference may be had to U.S. Pat. No. 3,350,182. While silicon carbide has many desirable properties making it suitable for a bushing material, nonetheless, when employing a bushing of this material as an electrically heated, or resistively heated bushing, problems will appear which severely handicap its useful life. This problem will be found to be especially acute at the points where electrical connectors are connected to the terminals, or tabs, of such a bushing. Generally what occurs is that under the environment in which the bushing is operating, silicon carbide converts to silica. Perhaps, in part, this is caused by a high current density at the connecting points but certainly the temperature and ambient environment also significantly influence the silica formation. When a silica layer forms between the terminal and connector the resistance increases dramatically. The voltage drop then is shifted to the contact area, rather than being across the bushing, and no further heating of the bushing is possible.

Thus it will be seen that there is a problem in the art and a need for a solution to this problem so as to allow silicon carbide bushings to be more expediently employed in the glass fiber manufacturing process. In accordance with the present invention applicant now satisfies this need and solves this problem by inhibiting the formation of silica.

Thus, in accordance with one feature of this invention, there is provided an electrically heated glass feeding apparatus which comprises a bushing essentially comprising silicon carbide, the bushing being adapted to maintain molten glass therein and to issue a stream of glass therefrom and the bushing including a pair of opposed electrical terminals or tabs means are provided for passing an electric current through the bushing between the terminals to resistively heat the bushing, the means comprising an electrical contact of an oxidizable, electrically conductive, carbon-containing material in direct electrical contact with one but not the other of the terminals and a metallic electrical connector in direct contact with that oxidizable material. The oxidizable, electrically conductive, carbon-containing material will be so disposed in the electrical contact so as to substantially preclude direct physical contact of the terminal, or tab, of the bushing and the current supplying connections. Desirably that material will be graphitic and in a preferred embodiment the material will be a member, or spacer, in the form of a graphite tape. Suitably, the tape is that supplied commercially by Union Carbide under the trademark Grafoil.

In accordance with another feature of this invention there is provided a method of heating a glass feeder which comprises passing electrical current from a metallic electrical terminal through an oxidizable, carbon-containing electrically conductive material to an electrical connector on the feeder and then through the feeder so as to provide a feeder which is directly resistively heated. By employing that material to physically isolate the terminal and connector from direct contact the conversion of silicon carbide to silica will be inhibited.

In the above mentioned patent, i.e. U.S. Pat. No. 3,350,182 there is disclosed a silicon carbide bushing mounted in a resistance heated element, the element having a pair of attached electrical terminals by which current is supplied to the element for resistance heating. It is indicated that the bushing may be formed by pyrolytic deposition of silicon carbide on a graphite block and the graphite burned away. The patent also indicates that instead of forming a bushing to fit the inside surfaces of the heating element the silicon carbide bushing may be formed as an integral part of the heating element by deposition directly on the graphite which is adapted to be connected into the electrical circuit for heating. Alternatively, the patent indicates that it is also possible to use the silicon carbide as a heating element as well as a bushing by doping the silicon carbide to the desired resistivity as it is deposited. Thus it will be readily seen that there is no appreciation or recognition in that patent of the present invention as a whole.

The foregoing and other advantageous features of this invention will be more readily apparent by reference to the drawings wherein:

FIG. 1 generally illustrates an embodiment of this invention;

FIG. 2 is a view taken along line 2—2 of FIG. 1.

Generally, FIG. 1 illustrates a glass feeder, or bushing, 10 which is fabricated of silicon carbide. The manner of fabrication can be any of the conventional techniques used for fabricating refractory structures such as, for example, hot pressing or injection molding. Generally, bushing 10 in cross section will include a rectilinearly shaped wall 12 and disposed at the outer portion thereof is an outwardly extending flange 14 which is adapted to be secured to a supply of molten glass as, for example, a forehearth generally designated 16. Conventional means may be employed for such purpose. The lower portion of bushing 10 has a bottom wall which includes a plurality of orifices 18 from which streams of molten glass issue. These streams are attenuated into fibers 20 which are in turn passed through a suitable size applicator 22 and they then converge to a suitable gathering means 24 in the form of a strand 26 which is then collected on a suitable roll-up drum 28.

Extending outwardly from opposed portions of wall 12 are a pair of electrical terminals, in the form of tabs 30 and 31 respectively, by which current is passed between those terminals and through bushing 10 so as to resistively heat it. In this way the bushing maintains molten glass from forehearth 16 at a suitable forming temperature. Each of the respective electrical terminals 30 and 31, is in direct electrical contact with a separate, oxidizable, electrically conductive member 32 (best seen in FIG. 2). In the preferred embodiment each member 32 will be a graphite tape and the tape will be disposed on opposing faces of each terminal in order to provide for a better electrical contact. Current is supplied to bushing 10 by means of a conventional arrangement typically employed in directly electrically heating precious metal bushings. Thus, tabs 30 and 31 each of which contains graphite tape 32, will be respectively attached to metallic bus bar connectors, for example copper members 34 and 35, respectively in the form of a fork-shaped member, which members in turn are connected by suitable wiring 36 and 38 to a power source for maintaining a potential across the bushing 10. Suitable clamping means 40, for example in the nature of a C-Clamp, will be employed to tighten the legs of the forked shaped connectors 34 and 35 against the graphite tape so as to minimize the contact resistance of the electrical contact. In fabricating the apparatus as indicated above, it will be found desirable to position the graphite tape such that no direct contact is made between connectors 34 or 35 with the respective tabs 30 and 31. Thus, since the members 32 are electrically isolated by means of bushing 10, all current will flow from a connector, for example 35, through its appurtenant graphitic member 32 and into the electrical terminal 30 then through the bushing; in such manner, the bushing will be heated and it will be found that the formation of silica adjacent each of the electrical contacts will be substantially inhibited.

While the benefits of the present invention will be most immediately apparent when employing a bushing consisting essentially of silicon carbide, the present solution of the problem in the art is applicable to bushings essentially comprising silicon carbide, i.e. where the silicon carbide is present in more than impurity amounts. Additionally, while not needed, if desired the silicon carbide can be appropriately doped to adjust the resistivity thereof to a prescribed value.

While the foregoing describes the present invention it will of course be apparent that modifications are possible which pursuant to the patent statutes and laws do not depart from the spirit and scope thereof.

I claim:

1. In an apparatus for forming glass fibers comprising a glass feeder adapted to discharge a stream of glass, said feeder including a terminal on each of opposed wall portions thereof, and means, including electrical connector means respectively connected to one or the other of said terminals, for passing an electrical current through said feeder so as to maintain said feeder at an elevated temperature, the improvement wherein said feeder essentially comprises silicon carbide, and disposed intermediate each of said terminals and its respective connector means, in electrical contact therewith, is a graphitic member inhibiting the formation of silica.

2. The improvement of claim 1 wherein said material is a graphite tape.

3. An electrically heated glass feeding apparatus comprising: a bushing essentially comprising silicon carbide, said bushing being adapted to maintain molten glass therein and to issue a stream of glass therefrom and including a pair of opposed electrical terminals; means for passing an electrical current through said bushing between said terminals to resistively heat said bushing, said means comprising a first electrical contact of an oxidizable, electrically conductive, carbon-containing material in direct electrical contact with one of said terminals and an electrical connection means directly contacting said material.

4. The apparatus of claim 3 wherein said material is so arranged and constructed as to preclude direct contact of said connector and said terminal.

5. The apparatus of claim 3 wherein said latter means further comprises a second electric contact of an oxidizable, electrically conductive, carbon-containing material in direct electrical contact with the other of said terminals and another electrical connection means directly contacting the latter material.

6. The apparatus of claim 4 wherein said material is graphite.

7. A method of heating a glass feeder formed from silicon carbide comprising passing electrical current from an electrical connector through an oxidizable, electrically conductive, carbon-containing material to an electrical terminal on said feeder and then through said feeder so as to provide a feeder which is directly resistively heated, said material inhibiting conversion of said silicon carbide to silica adjacent said terminal.

8. The method of claim 7 wherein said feeder consists essentially of silicon carbide.

9. The method of claim 8 wherein said material isolates said connector and terminal from direct physical contact.

10. The method of claim 9 wherein said material is graphite.

* * * * *